June 8, 1965

C. W. SLACK ETAL  3,187,469
LENS SURFACING APPARATUS AND METHOD

Filed May 16, 1962  6 Sheets-Sheet 1

INVENTORS
CORNELIUS W. SLACK
LLOYD W. GODDU
BY MERRILL H. BARBER

ATTORNEY

June 8, 1965  C. W. SLACK ETAL  3,187,469
LENS SURFACING APPARATUS AND METHOD
Filed May 16, 1962  6 Sheets-Sheet 4

INVENTORS
CORNELIUS W. SLACK
LLOYD W. GODDU
BY MERRILL H. BARBER

Louis K. Wagner
ATTORNEY

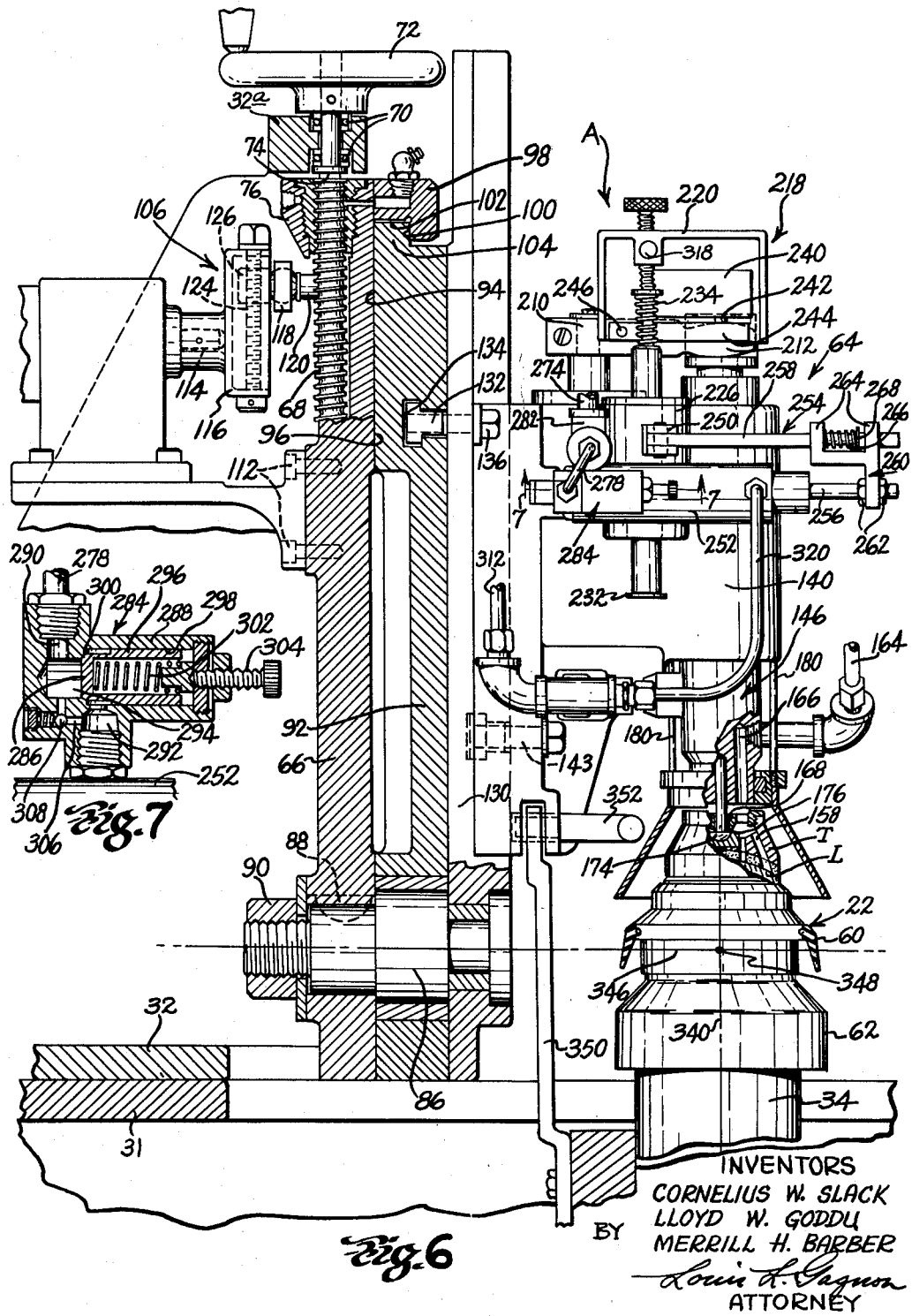

United States Patent Office 3,187,469
Patented June 8, 1965

3,187,469
LENS SURFACING APPARATUS AND METHOD
Cornelius W. Slack, Southbridge, and Lloyd W. Goddu and Merrill H. Barber, Sturbridge, Mass., assignors to American Optical Company, Southbridge, Mass., a corporation of Massachusetts
Filed May 16, 1962, Ser. No. 195,071
11 Claims. (Cl. 51—58)

This invention relates to the surfacing of lens blanks or the like and has particular reference to improved means and method for grinding curved surfaces on pressed or molded glass lens blanks.

A principal object of the invention is to provide novel means and method for grinding surface curvatures on glass pressings or moldings and further to accomplish the same with precision in a simple, economical and completely reliable manner.

Another object is to provide improved means for grinding spherical surface curvatures on pressed or molded lens blanks or the like with extreme accuracy of curvature and with a precision-controlled minimum depth of cut.

Another object is to accomplish the foregoing by the provision of novel surfacing apparatus and method utilizing a free-floating grinding tool having its effective abrading surface preformed to the particular surface curvature desired to be produced upon the lens blanks and which is oscillated arcuately about an axis substantially coincident with the center of curvature of the surface to be formed upon the lens blanks; the surfacing technique being termed herein as "cap generating."

Another object is to provide, in apparatus of the above character, novel precision means for surface grinding lens pressings or moldings to an established depth of cut which is referenced from the respective initially pressed or molded surfaces thereon.

Another object in relation to the preceding object is to provide automatically-operated depth of cut means in said apparatus for uniquely sensing initial engagement of the tool with a lens pressing or molding to be ground and for substantially simultaneously automatically setting said apparatus for a predetermined depth of cut in such manner as to cause the same to abrade only to said predetermined depth.

Another object is to provide novel, efficient and reliable fluid and mechanically-actuated means for effecting operation of said depth of cut means.

Another object is to provide in apparatus of the above character, compact and uniquely arranged power-driven means for arcuately oscillating a free-floating tool of the above character relative to a workpiece and adjustable means for setting said oscillating means simply and accurately in accordance with different powers or radii of curvature desired to be produced upon different workpieces.

Another object is to provide novel lens blank chucking means for supporting and rotating a lens blank to be surface ground in said apparatus.

Still another object is to provide cap generating apparatus of the above character which is simple and economical to build, operable with a minimum of supervision and is adapted to form spherical curvatures of various selected powers with exceptional precision on pressed or molded lens blanks or similar articles.

A further object is to provide apparatus and method by which lenses can be manufactured from pressed or molded blanks with a substantial savings in material, operational time and machinery maintenance particularly in the preliminary steps of forming a first-ground surface thereon.

Other objects and advantages will become apparent from the following description when taken in conjunction with the accompanying drawings in which:

FIG. 6 is an enlarged fragmentary partially cross-sectioned view somewhat similar to FIG. 5 taken generally along line 6—6 in FIG. 4 looking in the direction indicated by the arrows;

FIG. 7 is an enlarged fragmentary cross-sectional view taken approximately on line 7—7 in FIG. 6 looking upwardly as indicated by the arrows;

Figures 1, 2:
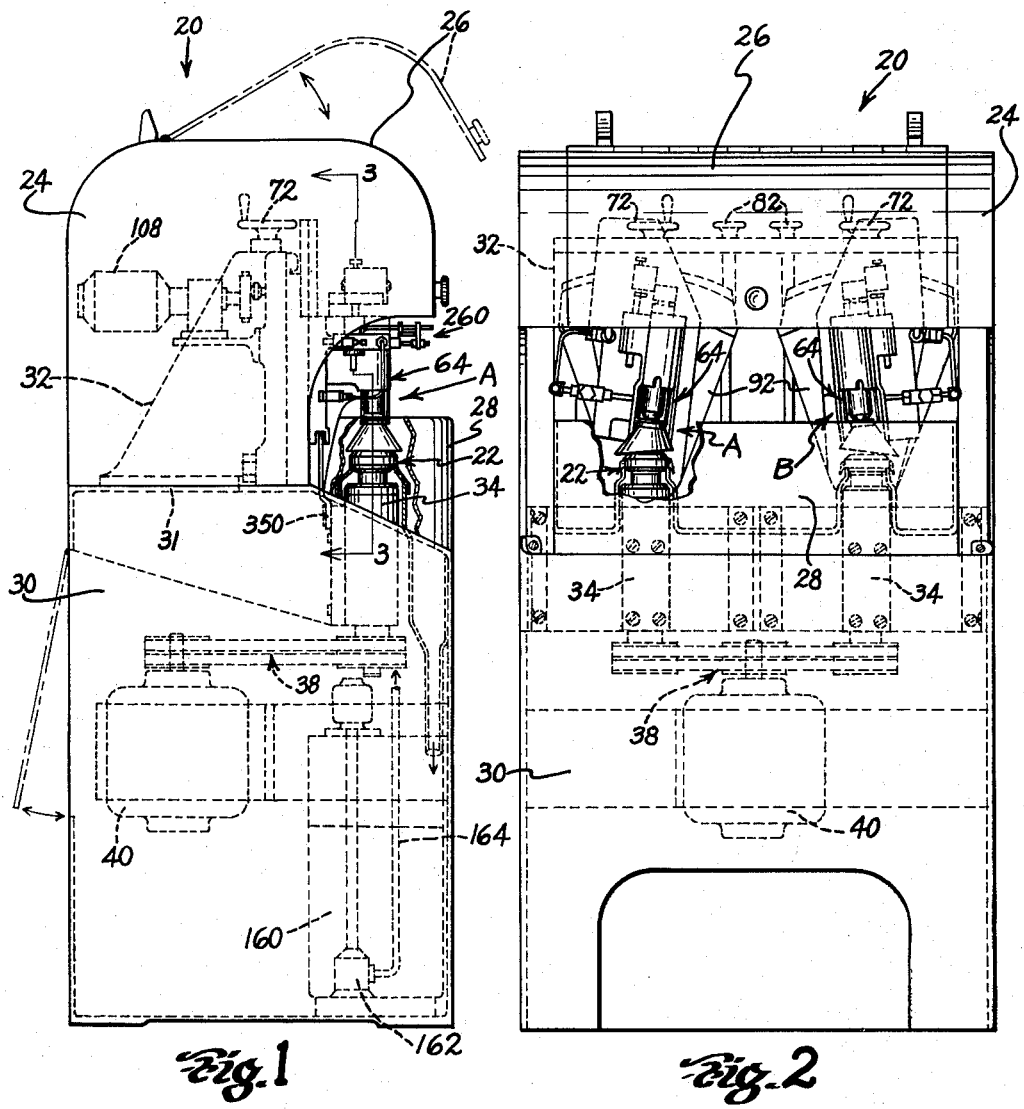
FIG. 1 is a side elevational view of the apparatus of the invention.
FIG. 2 is a front elevational view of the same apparatus.

In FIGS. 1 and 2 of the drawings, there is illustrated a preferred form of the invention which embodies a surfacing machine 20 having twin lens-grinding units A and B (see FIG. 2). The units A and B are identical in construction and operation and differ only in that their parts are arranged to be disposed in left and right-hand fashion respectively. That is, the parts of unit A which are disposed to the left thereof as viewed in FIG. 2 are positioned on the right of unit B only for convenience and compactness of installation in the main supporting structure of the machine 20.

The unit A, being in itself a complete embodiment of the invention and operable independently of the unit B, will be described in detail hereinafter with reference to the specific details of construction and operation thereof.

Throughout the various views of the drawings, like characters of reference will designate like parts and, in FIG. 2, identical reference characters will be applied to corresponding parts of units A and B.

In brief outline, the general arrangement and operation of each unit of the surfacing machine 20 is as follows:

A lens blank L which is to be provided with a ground spherical surface is supported at a fixed location in the machine 20 and rotated about its axis.

A cap-tool T (preferably diamond-charged) is positioned upon the surface of the lens blank which is to be ground and is urged thereagainst under controlled pressure to effect a grinding action. The tool T is supported in a free-floating manner and is disposed generally to one side of the axis of the lens L with an edge thereof slightly overhanging an edge of the lens blank L at all times. Further, the tool T is provided with a spherically curved abrading face whose radius of curvature is precisely formed to the particular curvature which is to be ground upon the lens blank L and its axis is disposed so as to intersect the axis of the lens blank L substantially at a point thereon coincident with the location of the center of curvature of the ground surface to be produced upon the lens blank.

The grinding of the lens blank surface to a true spherical curvature matching that provided on the abrading face of the tool T is accomplished by simultaneously rotating the lens blank about its axis and oscillating the free-floating tool laterally across the lens blank surface in an arcuate path whose center of curvature is coincident with the above-mentioned center of curvature of the ground surface to be produced upon the lens blank L.

In accordance with another feature of this invention, the lens blanks are ground only to a depth sufficient to remove defects from the pressed or molded surfaces thereof so that excessive and wasteful removal of lens blank material is eliminated. In so doing, a major savings in grinding time, tool wear, glass and machinery maintenance is realized.

In the present invention, lens blanks are ground to a predetermined minimum but adequate depth of cut by referencing the depth of cut from the pressed or molded surface to be ground on each lens blank during its respective grinding operation.

In brief outline, the grinding operation proceeds as follows:

A lens blank L is supported in a rotatable chuck 22 which is disposed at a fixed level in the machine 20 as will be described in detail hereinafter and the tool T is movable toward and away from the surface of the lens blank L which is to be ground.

With the tool T initially positioned away from the chuck 22, to permit placement of a lens therein, the abrading operation begins by moving the tool T toward the lens blank L which has been placed in the chuck 22. Movement of the tool T toward the lens blank L is accomplished by means of an air-actuated piston. At this time, the chuck is rotated to cause the lens blank L to rotate about its axis and the tool T is oscillated laterally as described above.

When the tool T engages the surface of the lens blank L, resistance to further movement toward the lens blank L causes a back pressure to build up immediately in the tool-actuating piston. The back pressure is then utilized to actuate a depth of cut control mechanism in the machine 20. From the point of engagement of the tool T with the lens blank L, the tool T is forced by pressure in the air-actuated piston to continue its movement toward the lens blank L and thus grind the engaged lens blank surface. Upon reaching a predetermined depth of cut below the initial surface of the lens blank, the tool T is automatically retracted and the surface-ground lens blank L is removed from the chuck.

It is pointed out that the apparatus of the invention functions to literally sense the location of the pressed or molded surface of the lens blank to be ground and measures the depth of cut from the point at which the tool first engages the lens blank. Thus, the depth of cut is referenced from the pressed or molded surface of the lens blank itself.

Referring more particularly to the details of construction and arrangement of parts in the embodiment of the invention shown in the drawings, it can be seen in FIGS. 1 and 2 that the major lens grinding units A and B are normally enclosed and operated within a protective housing 24.

The housing 24 has an upper cover 26 which may be opened as shown in FIG. 1 to provide access to the units A and B when it is desired to make adjustments thereon such as will be described hereinafter. Also, as a part of the general housing 24, a splash pan 28 is provided to contain and collect a liquid coolant which is used in the lens-grinding operation.

Within the housing 24, the units A and B are supported upon a cabinet-like base 30 formed with an inner supporting framework 31 of structural steel upon which the respective units A and B are mounted. A head casting 32 is positioned upon the framework 31 which supports the uppermost mechanisms of the respective units A and B. In the particular arrangement which is illustrated, the head casting 32 supports the upper mechanisms of the units A and B and the framework 31 supports the lower mechanisms of said units A and B.

It is pointed out, however, that each unit A or B comprises, in itself, a complete embodiment of the invention and, accordingly, a single unit machine 20 might be constructed. In such a case, the machine would embody base and head casting parts comparable to either the left or right-hand halves of those illustrated in the drawings.

Referring more specifically to the unit A which is shown in detail throughout the various views of the drawings, it will be seen that said unit comprises a vertically disposed work spindle housing 34 which is bolted or otherwise fixed to the forward side of the base framework 31.

A work spindle 36 (see FIG. 3) is journalled coaxially within the spindle housing 34 and is driven at its lowermost end by a belt and pulley arrangement 38 (see FIGS. 1 and 2) powered by an electric motor 40.

Figure 3:
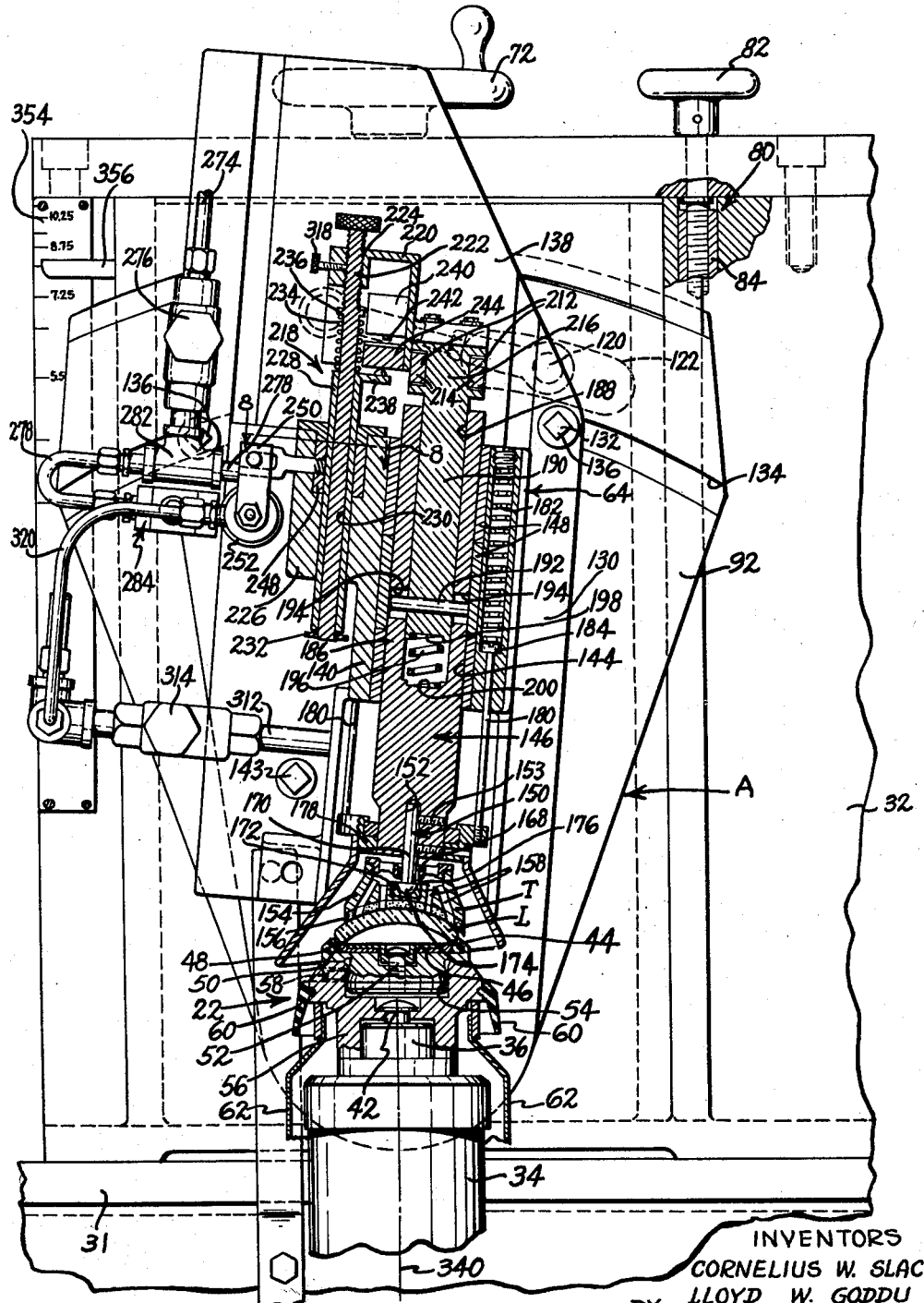
FIG. 3 is an enlarged vertical cross-sectional view taken approximately on line 3—3 in FIG. 1 looking in the direction indicated by the arrows.

Upon the upper end of the work spindle 36, there is provided a lens blank-receiving chuck 22 which is attached to the work spindle 36 by a stud or the like 42 (see FIG. 3). The chuck 22 is provided with an adaptor 44 having a lens blank receiving recess 46 therein. An annular liner 48 of pliable plastic material or relatively hard rubber or the like is provided to engage the edges of a lens blank L when placed in the recess 46 and a seat 50 upon which the lens blank L rests is positoned in the bottom of the recess 46. The liner 48 is shouldered into the sides of the recess 46, illustrated in FIG. 3, and is further held in place by a tapered edge on the seat 50. The seat 50, in turn, is fastened to the adaptor 44 with a holding stud or the like 52. The adaptor 44 is fitted into a recess 54 in the main body part 56 of the chuck 22 and is clamped in place with one or more set screws or the like 58.

The lens-receiving seat 50 is preferably formed of a plastic material which has been impregnated with a grit such as emery or the like so as to provide a gripping effect upon a lens blank seated thereagainst and thus prevent rotational slippage of the lens blank in the chuck 22.

A liquid coolant is flowed over the lens blank L during a grinding operation as will be described in detail hereinafter and, accordingly, splash guards 60 and 62 are provided on the chuck 22 to prevent said coolant from entering and befouling the adjacent end of the spindle housing.

An abrading head 64 which carries the grinding tool T is mounted on the head casting 32 by means of a series of interconnected slides and plate members which are adjustable one relative to the other.

A first of these members which will be referred to hereinafter as the main slide 66 (see FIGS. 4 and 6) is dovetailed into the head casting 32 in such manner as to be vertically adjustable on the head casting 32. Vertical adjustment of the main slide 66 is effected by operation of a vertically disposed lead screw 68 which is journaled in the uppermost portion 32a of the head casting 32 by bearings 70 (see FIG. 6). An operating handle 72 and a collar 74, one disposed adjacent each side of the portion 32a, function to prevent vertical displacement of the lead screw 68 in the head casting 32.

The main slide 66 is provided with an integral rearwardly extending boss 76 through which the lead screw 68 is threaded so that rotation of the lead screw 68 by operation of the handle 72 will cause the main slide 66 to be carried by the boss 76 along the lead screw either upwardly or downwardly in accordance with the direction of rotation of the handle 72.

The main slide 66 is guided by the dovetailed guideway 78 (see FIG. 4) in the head casting 32 and a conventional wedge-type gib lock 80 is provided to lock the main slide 66 to the head casting at any desired adjusted position. Rotation of the gib lock handle 82 in one direction will force the locking gib 84 into binding relation with the main slide and dovetail guideway 78 while rotation of the handle 82 is an opposite direction will release the main slide 66 and permit vertical adjustment thereof.

The main slide 66 is further provided with a forwardly extending pivot post 86 adjacent its lowermost end. The pivot post 86 is keyed against rotation and locked to the main slide 66 by means of the key 88 and lock nut 90 shown in FIG. 6.

On the pivot post 86, there is journaled a plate 92 which is adapted to be oscillated arcuately about the axis of the pivot post 86 while being retained in intimate side-by-side engagement with the main slide 66 at all times adjacent the uppermost end of said slide 66. The plate 92 will be referred to hereinafter as the oscillating plate 92 and is provided with a machined and finished surface 94 which engages and rides against a similar surface 96 provided on the main slide 66 (see FIG. 6).

In order to retain the uppermost end of the oscillating plate 92 in intimate sliding relation with the main slide 66 at all times, a forwardly disposed overhanging lip 98 is provided on the main slide 66. The lip 98 is accurately machined and finished on its inner side 100 so as to form a channel 102 into which a machine-finished upper edge 104 of the oscillating plate 92 is fitted. The lip 98 thus functions to retain the oscillating plate 92 against the main slide 66 and guides it during oscillation about the pivot post 86.

As it will become apparent hereinafter, the oscillating plate 92 functions to oscillate the head 64 and, consequently, the tool T arcuately over a lens blank being ground about a pivotal axis (the axis of pivot post 86) which intersects the axis of the lens blank L at the center of curvature of the surface to be ground on the lens blank. Also, the above-described vertical adjustment of the main slide 66 which carries the oscillating plate 92 is provided to position the pivotal axis of the oscillating plate at such a preselected position as to intersect said center of curvature of the surface to be ground on the lens blank L.

Figure 4:
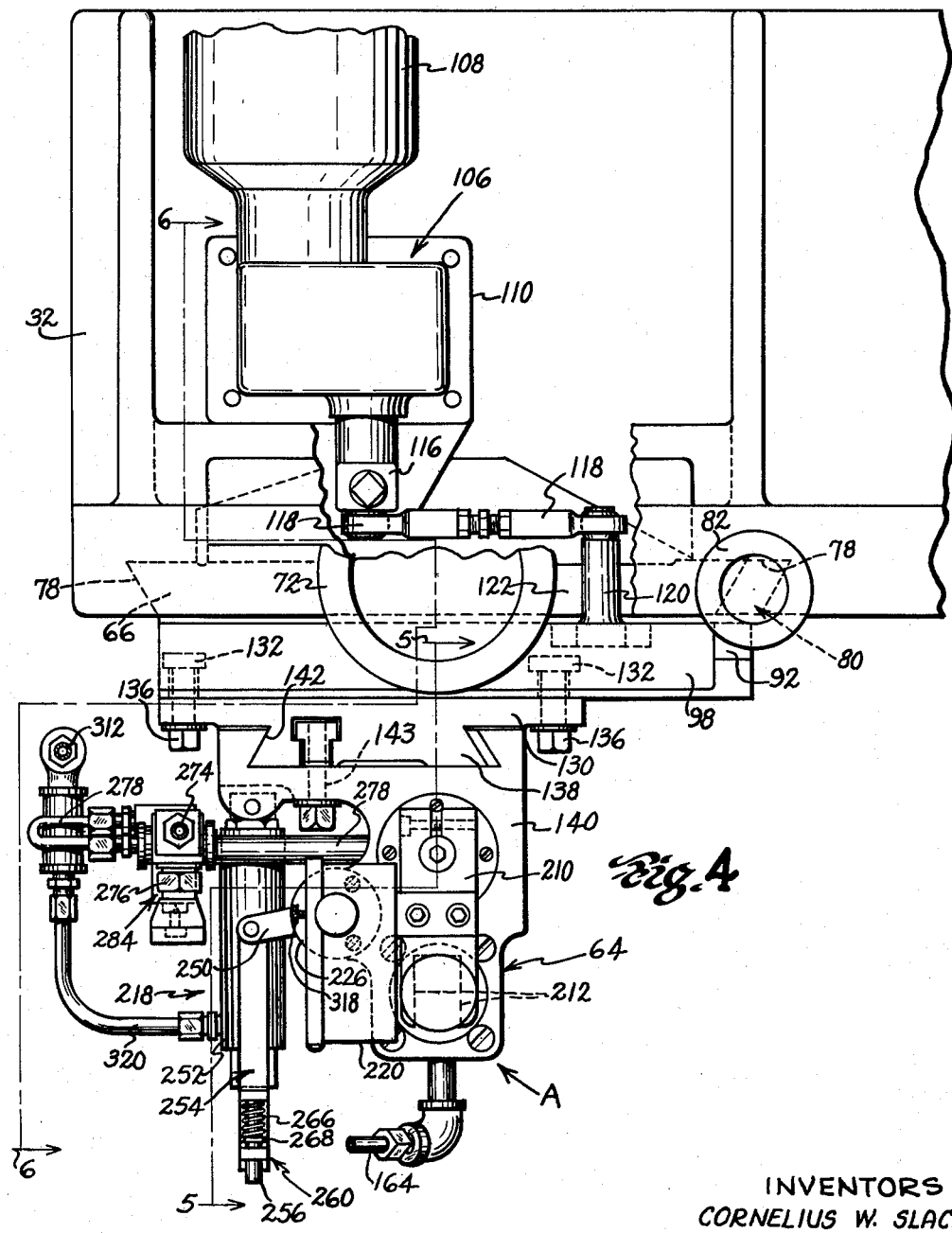
FIG. 4 is a fragmentary top plan view of a portion of the apparatus shown in FIGS. 1 and 2.

The plate 92 is oscillated arcuately about the axis of the pivot post 86 by means of a motor-driven actuating mechanism 106 (see FIGS. 4 and 6).

The mechanism 106 comprises a drive motor 108 which is supported on a bracket 110 attached to the rear side of the main slide 66 by bolts 112 or the like. Driven by the motor shaft 114 is a crank member 116 which, in turn, is connected to the oscillating plate 92 by a laterally extending arm 118 generally resembling a turnbuckle so as to be adjustable as to its length. Making the connection between the arm 118 and the oscillating slide 92 is a rearwardly extending post 120 on the slide 92 which extends through a slot 122 in the main slide 66 (see FIGS. 3 and 4).

The crank 116 is provided with an adjusting screw 124 which carries a traversing lug 126 making the connection between the arm 118 and crank 116. The arm 118 is pivotally connected to the lug 126 at one end and similarly pivotally connected to the post 120 at its opposite end so that, with the lug 126 offset from the axis of the motor shaft 114, the eccentricity of the crank 116 will oscillate the slide 92 when the motor 108 is operated. The extent to which the lug is offset with relation to the axis of the motor shaft 114 will determine the degree of oscillation of the plate 92. Adjustment of the lug 126 is made by rotating the screw 124.

Also mounted on the pivot post 86 is a second plate 130 which is used to tilt the head 64 so as to position the tool T generally to one side of the lens blank L as described hereinabove. The plate 130 will be referred to hereinafter as the tilting plate 130 and is held against the oscillating plate 92 by means of T-bolts 132 (see FIGS. 3, 4 and 6). One end of each of the T-bolts 132 is fitted into an arcuate T-slot 134 (see FIGS. 3 and 6) and the other ends of the bolts 132 extend through the tilting plate 130. Clamp nuts 136 are provided to draw the T-bolts forwardly against the forward edges of the T-slot 134 and thus clamp the tilting plate 130 firmly against the oscillating plate 92 when the nuts 136 are tightened.

The arc of the T-slot 134 is concentric with the axis of the pivot post 86 so that by loosening the clamp nuts 136, the tilting plate may be manually adjusted to swing the head 64 to any required angle of tilt relative to the axis of the work spindle 36 whereupon the clamp nuts would again be tightened.

The forward side of the tilting plate 130 is provided with a dovetailed guideway 138 (see FIGS. 3 and 4) which carries the head 64.

The head 64 comprises a main casting 140 having a dovetailed slide 142 formed on its rear side which is fitted upon the guideway 138. The casting 140 is clamped to the tilting plate 130 by one or more T-bolts 143 (see FIGS. 3 and 6) in substantially the same manner as the tilting plate 130 is clamped to the oscillating plate 92 by the bolts 132 described above. With the bolt 143 loosened, the head 64 may be raised or lowered on the tilting plate 130 or, actually, as it will be described in detail hereinafter, the head 64 is held in a fixed relation with the base 30 and the entire assembly of the plates 130 and 92 is adjusted as a unit up or down relative to the head 64 by actuation of the main slide 66. This adjustment places the axis of the pivot post 86 at a desired level with relation to the surface of a lens blank L in the chuck 22 without displacing the head 64 from its normal intended operative position.

In a description of the setting up and operation of the machine 20 which will follow, the adjustments of the above-mentioned slides and plates and reasons for making the same will be explained in greater detail.

The casting 140 of the head 64 is provided with a longitudinal bore 144 therethrough (see FIG. 3) in which a two-part tool-supporting shaft 146 is intimately slidably fitted by means of bushings 148.

The axis of the shaft 146 intersects the axis of the work spindle 36 at all times regardless of the extent to which the head 64 is tilted or oscillated relative to the work spindle 36.

At the depending end of the shaft 146, there is provided a tool-holding pin 150 which is inserted into an opening 152 extending coaxially into the shaft 146. The holding pin is secured in place with set screws or the like 153.

Figure 5:
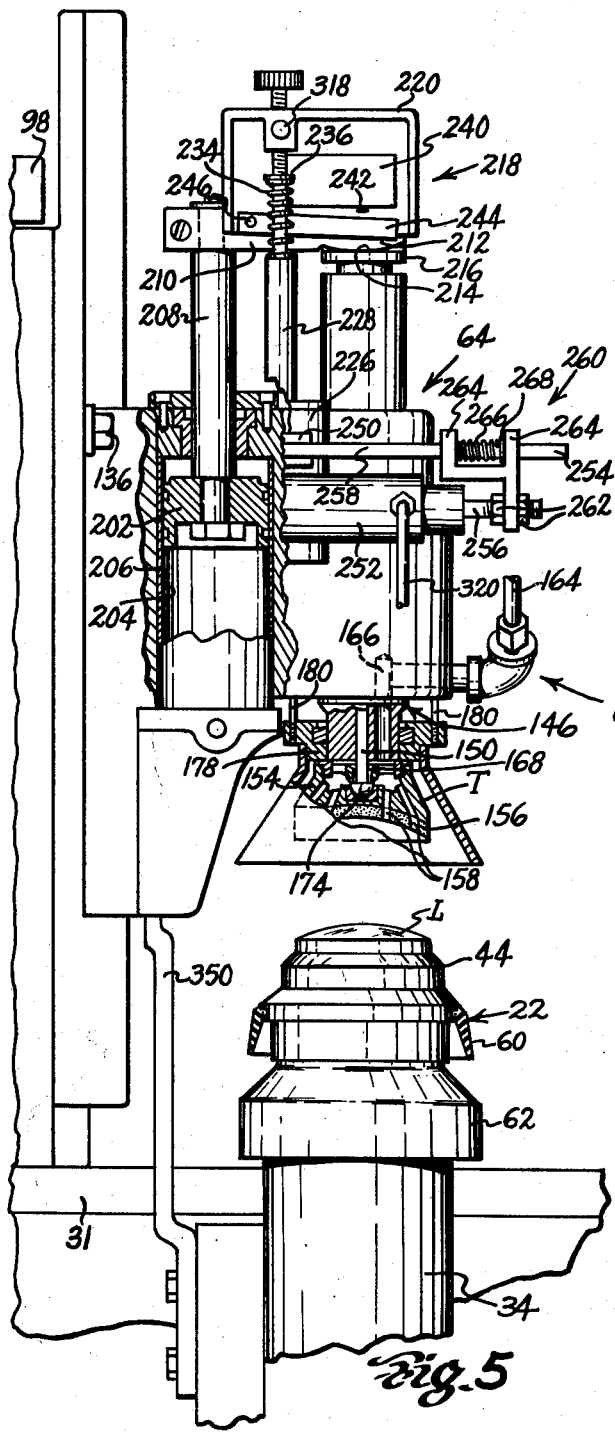
FIG. 5 is an enlarged partially cross-sectional view taken approximately along line 5—5 in FIG. 4 looking in the direction indicated by the arrows.

The tool T comprises a body part 154 and a diamond-charged abrading face section 156 bonded or otherwise firmly attached to the body part 154. A plurality of passageways 158 are provided in the body part 154 of the tool T through which a grinding coolant is fed to the face section 156. The face section 156, in its preferred form, is also provided with openings therethrough to allow the coolant to flow onto the surface of a lens blank L being abraded. The coolant is fed from a supply 160 (see FIG. 1) by means of a pump or the like 162 and supply line 164 into an opening 166 in the 146 (see FIG. 5). The coolant flows downwardly from the opening 166 into the passageways 158 in the tool T.

The upper portion of tool body part 154 is provided with a supporting cage 168 which fits relatively loosely about the shank 170 of the tool-holding pin 150 and a socket 172 in the tool body part 154 receives an enlarged hemispherically-shaped end 174 of the pin 150. In this way, the tool is supported in a free-floating universal manner and is permitted to swivel sufficiently to seat accurately upon the surface of a lens blank L when lowered thereagainst as will be described in detail hereinafter.

In order to lift the tool T away from the lens blank L when the tool-supporting shaft 146 is raised, the cage 168 is provided with a depending shoulder 176 which is engaged by the upper flanged edge of the hemispherically-shaped end 174 of the pin 150. That is, when the tool T is in grinding relation with the lens blank L, the end 174 of the pin 150 is seated directly in the socket 172 and the upper flanged edge of the end 174 of the pin 150 is spaced from the shoulder 176 as shown in FIG. 3 so as to provide the tool T with the above-mentioned free-floating action. However, when the shaft 146 is raised, the end 174 of the pin lifts slightly in its socket 172 and engages the shoulder 176 so as to cause the tool T to be carried, from this point on, upwardly with the shaft 146.

In view of the fact that the tool T might wobble as it is lifted and possibly damage the finally ground surface of the lens blank or damage the edge of its own abrading face by striking the lens blank while wobbling, means is provided to prevent tool wobble as it is raised by the shaft 146. This means comprises a collar assembly 178 which is closely fitted around the shaft 146 as shown in FIG. 3.

The collar assembly 178 is supported by spring-biased rods 180 depending from the casting 140 of the head 64. With the tool T in grinding relation upon the lens blank L, as illustrated in FIG. 3, the rods 180 are biased by springs 182 downwardly against a shouldered stop 184 within the casting 140 so as to position the collar assembly 178 in slightly spaced relation with the tool T, as shown in FIG. 3. This allows the tool T to float freely on the lens blank L during grinding.

When the tool-supporting shaft 146 is raised to lift the tool away from the lens blank L, a slight upward movement of the tool T causes the outer edges of its cage 168 to engage the collar assembly 178 (see FIG. 5) and prevent tool wobble. As it can be seen in FIGS. 3 and 5, the tool-supporting shaft 146 retracts slightly into the downwardly spring-biased collar assembly 178 as it begins its upward movement so as to cause the tool T to engage the collar assembly 178. Once the tool T has engaged the collar assembly, it (the tool T) causes the collar assembly to be carried along with the tool-supporting shaft upwardly against the tension of the springs 182.

It can be seen in FIG. 3 that the tool-supporting shaft 146 is a two-part structure as mentioned above. Its main structure 186, which carries the tool T in the manner just described, is provided with an internal bore 188 into which is slidably fitted an upper part 190 which is employed to raise or lower the shaft 146 as a unit.

The upper part 190 of the tool-supporting shaft 146 is keyed to the main structure 186 thereof by a transversely extending pin 192 in the upper part 190 whose opposite ends are fitted into receiving slots 194 in the main structure 186.

A shock-absorbing spring 196 is placed between the depending end 198 of the upper part 190 and the bottom 200 of the bore 188. The slots 194 are of a width approximately equal to the diameter of the pin 192 so as to prevent relative rotational movement between the main section 186 and the part 190 of the shaft 146 and the lengths of the slots 194 are such as to allow a slight axial movement to take place between the parts 186 and 190 of the shaft 146.

The spring 196 is selected to be of such character as to permit a downward force to be applied to the tool T which is sufficient to effect a desired cutting or grinding action on the lens blank L without the spring being compressed appreciably. At the same time, however, the character of the spring 196 is also such as to absorb most vibrations or shock which might be caused by roughness or irregularities encountered on the initially pressed or molded surface of the lens blank L.

While the above-mentioned slots 194 are of a sufficient length to permit the spring 196 to absorb vibrations which might be encountered in the initial stages of grinding, their lengths are controlled to minimize lost motion between the two parts of the shaft 146 when the shaft is lifted to raise the tool T. As the part 190 of the shaft 146 is lifted, the pin 192 therein will engage the upper ends of the slots 194 and thus cause the main section 186 to follow.

The tool-supporting shaft 146 is raised and lowered by means of a double acting piston 202 (see FIG. 5) operated in an air cylinder 204. The cylinder 204 is disposed within a bore 206 provided in the casting 140 of the head 64 and the axis of the cylinder 204 is parallel to the axis of the tool-supporting shaft 146. A piston rod 208 carried by the piston 202 is provided with a forwardly extending yoke 210 whose bifurcated forward end 212 is fitted into receiving channels 214 formed in an enlarged upper end portion 216 of the shaft 146. Thus, when the piston 202 is raised in its cylinder 206, the piston rod raises the yoke 210 which carries the work-supporting shaft 146 upwardly. Downward movement of the piston 202 accordingly lowers the work-supporting shaft 146.

As mentioned hereinabove, the machine 20 is provided with a depth of cut control means which references the depth of cut from the point of initial contact of the tool T with the lens blank L. This depth of cut mechanism is generally indicated by reference numeral 218 in FIGS. 3–6 and comprises a box-like main supporting structure 220 attached to and movable with the enlarged upper end portion 216 of the tool-supporting shaft 146. An adjustable rod 222 for setting the mechanism 218 for a desired depth of cut is threaded through the upper side of the box-like structure 220 at 224 and extends downwardly through a lateral extension 226 of the casting 140.

The adjusting rod 222 is provided with an outer sleeve 228 which is slidably fitted in a bore 230 through the extension 226. In order to hold the sleeve 228 on the adjusting rod 222, a snap washer or the like 232 is fastened to the depending end of the adjusting rod 222 and a spring 234 on the rod 222 functions to urge the sleeve downwardly against the snap washer 232. The spring 234 is placed under compression between the upper end of the sleeve 228 and a shouldered part 236 on the rod 222.

On the upper end of the sleeve 228, there is provided a laterally extending anvil 238 whose function is to actuate the depth of cut mechanism 218 in a manner which will become readily apparent as the description of the mechanism 218 progresses.

Also in the box-like structure 220, there is provided a microswitch 240 having a depending switch button 242. Below the microswitch 240 and disposed in between the anvil 238 and switch button 242, is a switch actuating arm 244 (see FIGS. 3, 5 and 6). The switch actuating arm 224 is freely pivoted at 246 adjacent the rear side of the box-like structure 220 so as to extend forwardly and rest, under its own weight, upon the anvil 238.

In the extension 226 of the head 64, there is provided an eccentric lock 248 (see FIGS. 3 and 8) which functions to lock the sleeve 228 in the bore 230 when the lock 248 is rotated to one position. When the lock 248 is in another rotated position, it allows both the sleeve 228 and rod 222 to slide freely as a unit in the bore 230.

Figure 8:
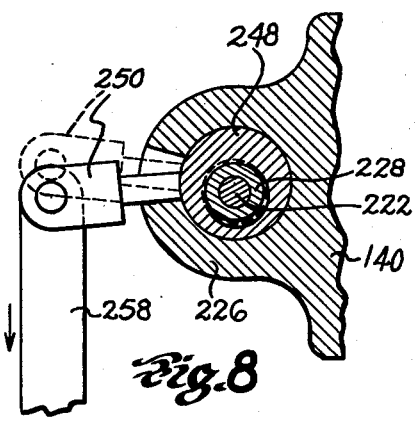
FIG. 8 is an enlarged fragmentary cross-sectional view taken approximately on line 8—8 in FIG. 3 looking in the direction indicated by the arrows.

The lock 248 is rotatably actuated by a laterally extending clevis arm 250 which, in the forward position shown in FIG. 8 by full lines, clamps the sleeve 228 to the casting 140 in a manner analogous to that of a conventional locking ring on a micrometer. When the arm 250 is moved rearwardly as shown by dotted outline in FIG. 8, the lock 248 releases the sleeve 228 and allows it to slide freely through the bore 230 in the extension 226 of the casting 140.

The clevis arm 250 is actuated by a double acting air cylinder 252 having an L-shaped linkage 254 interconnecting the piston rod 256 of the cylinder 252 with the clevis arm 250. The linkage 256 comprises a rod 258 pivotally connected at one end to the clevis arm 250 and disposed approximately parallel to the piston rod 256 (see FIG. 6). The respectively adjacent ends of the piston rod 256 and the rod 258 are interconnected by a sliding yoke 260 whose depending end is fastened to the piston rod 256 by lock nuts 262 or the like. The rod 258 slides through openings in the upper bifurcated ends 264 of the yoke 260 and a compression spring 266 is placed around the portion of the rod 258 between the bifurcated ends 264 of the yoke 260. One end of the spring 266 abuts the inner side of the rearwardly disposed bifurcated end 264 and the other end of the spring 266 abuts a collar 268 fixed upon the rod 258. Thus, forward movement of the piston rod 256 pulls the rod 258 forwardly with the spring 266 resisting compression and providing a cushioning action to effect the above-described locking of the sleeve 228 to the extension 226 of the casting 140. The spring 266 prevents excessive tightening of the lock 248 on the sleeve 228 although it is of sufficient tension to cause the lock 248 to hold securely in its locked position.

Movement of the piston rod 256 inwardly or into the cylinder 252 causes the forward bifurcated end 264 of the yoke 260 to engage the collar 268 (see FIG. 5) and move the rod 258 rearwardly so as to unlock the sleeve 228 and render it freely slidable in the extension 226 of the casting 140.

As mentioned hereinabove, the depth of cut control mechanism 218 is operated in conjunction with the tool T feed mechanism by means of a compressed air system which operates the pistons in the respective air cylinders 204 and 252.

Figure 9:
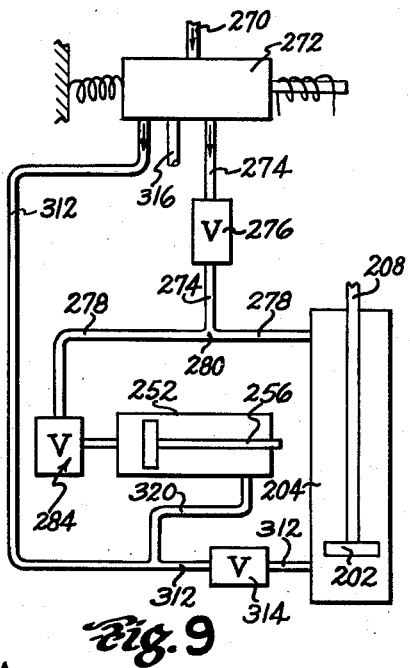
FIG. 9 is a schematic layout of an air system incorporated in the apparatus.

The air system is shown schematically in FIG. 9 for ease of illustration and its respective components are illustrated in detail in FIGS. 3, 4, 6 and 7. Corresponding parts will bear like reference characters throughout the various figures of the drawings.

In commencing a lens blank grinding operation, the tool T is lowered by actuation of the air cylinder 204 which, through the above-described associated mechanisms, causes the tool-supporting shaft 146 to lower in the head 64. In so doing, the depth of cut mechanism 218 (which is carried by the uppermost end of the tool-supporting shaft 146) accordingly lowers with the tool-supporting shaft 146 causing the sleeve 228 to slide in the bore 230, the lock 248 being released at this time.

Compressed air is directed into the cylinder 204 from a supply line 270 (see FIG. 9). By means of a conventional solenoid operated selector valve 272, the air is caused to flow into an air line 274 and through a conventional adjustable flow control valve 276 which restricts the flow of air in the line 274 in the usual manner of operation of such devices so as to maintain a uniform flow rate into the cylinder 204.

From the line 274, the air passes through a line 278 into the upper end of the cylinder 204 above the piston 202 thereby forcing the piston 202 downwardly at a controlled rate which is set by the flow control valve 276.

It will be seen in FIGS. 3 and 9 that the air lines 274 and 278 are junctioned at 280 with a T-connection 282 (see FIGS. 3, 6 and 9). In this way, one end of the air line 278 leads to the cylinder 204 and its opposite end leads to an air sequencing valve 284.

Details of the sequencing valve 284 are shown in FIG. 7 wherein it can be seen that the valve functions to pass air from the air line 278 into the cylinder 252 only when the pressure in the air line 278 is sufficient to open a gate 286 in the valve which functions to open or close communication between the air line 278 and cylinder 252.

The valve 284 comprises a main body 288 which is machined so as to provide an internal passageway 290 for receiving air from the air line 278. Approximately parallel with the passageway 290 but in offset relation therewith, a second passageway 292 is provided which leads into the cylinder 252. Interconnecting the passageways 290 and 292 is a third passageway 294 in which the gate 286 is located and disposed between the passageways 290 and 292. The gate 286 embodies a plunger 296 which slides in an enlarged portion 298 of the passageway 294 and a seat 300 is provided against which an end of the plunger normally comes to rest so as to close communication between the passageways 290 and 292. The plunger 296 is spring-loaded against the seat 300 by a spring 302 which can be compressed more or less by an adjusting screw 304 to increase or decrease the force tending to urge the plunger 296 against the seat 300.

When the pressure in the passageway 290 builds to an amount sufficient to overcome the opposing force of the spring 302, the plunger 296 will be forced back against the spring and thus open the gate 286 to permit air from the passageway 290 to pass into the passageway 292 and into the cylinder 252.

As it will become apparent hereinafter, air in the cylinder 252 must reverse its travel through the sequencing valve 284 during a subsequent phase of the operation of the machine 20. That is, air must exhaust from the cylinder 252 through the valve 284 and into the line 278. For this purpose, an L-shaped exhaust passageway 306 is provided to by-pass the gate 286.

In the L-shaped exhaust passageway 306, a ball closure member 308 is spring-loaded to close the L-shaped exhaust passageway 306 against high pressure in the passageways 294 and 290. The use of the L-shaped exhaust passageway 306 will be discussed in detail hereinafter and, at this point, the description of the air system in its function to lower the tool T and actuate the depth of cut mechanism 218 will continue from the point where the cylinder 204 is functioning to lower the tool-supporting shaft 146 at a controlled rate.

During the downward movement of the tool-supporting shaft 146, the pressure in the air line 278 is not sufficient to open the gate 286 in the sequencing valve 284. That is, the adjusting screw 304 is set to bias the plunger 296 closed against the seat 300 under the normal pressure used to lower the tool-supporting shaft 146. Furthermore, it should be understood that at all times, friction in the normal close fit of the tool-supporting shaft 146 in its respective bushings 148 and the fit of the piston 202 in its cylinder 204 prevent the tool-supporting shaft 146 from dropping downwardly under its own weight. Furthermore, a cushion of air in the cylinder 204 between its bottom and the underside of the piston 202 also functions along with the above-mentioned friction to prevent the tool-supporting shaft 146 from lowering under its own weight.

As the tool-supporting shaft 146 is lowered, however, the air in the lower section of the cylinder 204 is exhausted through an air line 312 (see FIGS. 3 and 9) having a conventional flow control valve 314 therein. The air line 312 leads to the solenoid-operated valve 272 which, when in the position for feeding air into line 274 simultaneously connects the line 312 to an exhaust port 316. It is pointed out that the valve 272 is a conventional piece of equipment referred to in the trade as a four-way solenoid operated distributing valve and performs the functions described herein in conventional fashion.

The moment tool T engages the surface of the lens blank L which is to be ground, resistance to further downward movement of the shaft 146 causes a back pressure to build up in the cylinder 204 and in the air line 278 which back pressure forces the gate 286 in the sequencing valve 284 to open. The air in the line 278 then feeds through the valve 284 into the cylinder 252 causing its piston rod 256 to move forwardly and thereby actuate the lock 248 (see FIG. 8) which locks the collar 228 to the extension 226 of the casting 140. This, then, fixes the anvil at a predetermined position relative to the casting 140 as referenced from the surface of the lens blank L.

With the sleeve 228 locked to the casting 140, the air pressure on the piston 202 causes the tool T to continue its travel toward the lens blank and thereby grind the surface thereof. An air pressure preferably of approximately 60 pounds per square inch is applied to the piston 202 and as described above, the tool T is oscillated sidewise while the lens blank is rotated about its axis to effect a grinding of the surfaces of the lens blank L.

As the tool, in grinding the lens blank, continues its downward movement from the point where the sleeve 228 became locked to the casting 140, it can be seen that the box-like structure 220 which carries the depth of cut adjusting rod 222 and the switch actuating arm 244 continues to move downwardly with the tool-supporting shaft 146. The rod 222 which is carried by the box-like structure 220 also slides downwardly in the sleeve 228 against the tension of the spring 234. In so doing, the switch-actuating arm which rests on the anvil 238 is pivoted upwardly until it engages the microswitch button 242 which trips the microswitch 240. The microswitch 240 causes the solenoid valve 272 to shift and reverse the flow of air in the system shown in FIG. 9. This stops the downward travel of the tool T and simultaneously causes the tool T to retract from the lens blank L in a manner which will be described in detail shortly.

It can be seen that the depth of cut on the lens blank L (the distance from the point where the tool T first engages the lens blank surface to the point where the tool retracts from the lens blank) is determined by the spacing initially provided between the microswitch button and the switch-actuating arm 244. That is, if it is desired to remove .5 of a millimeter from the surface of the lens blank L, the spacing between the microswitch button and the switch-actuating arm is set to be .5 of a millimeter by threading the adjusting rod 222 up or down in the box-like structure 220 whatever amount is required. This adjustment for depth of cut is made prior to the start of a grinding operation when the sleeve 228 is unlocked, that is, when the sleeve 228 is freely slidable in the extension 226 of the casting 140 and when its lower end is abutted against the washer 232 on the adjusting rod 226. Once a desired depth of cut adjustment is made, a lock screw 318 (see FIGS. 3 and 5) is tightened.

Upon reaching the final depth of cut wherein the microswitch 240 is actuated by the switch-actuating arm 244, the microswitch 240 causes the solenoid valve 272 to shift in such manner as to cause air from the supply line 270 to now enter the line 312. At the same time, air in the system will exhaust from the line 274 through the exhaust port 316. In so doing, the air from the supply line 270 immediately builds up pressure in the line 312 and also in a line 320 which extends laterally from the line 312 into the forward end of the cylinder 252.

The air pressure in the lines 312 and 220 causes the piston in the cylinder 252 to retract thereby pulling its piston rod 256 inwardly so as to cause the linkage 254 to unlock the sleeve 228 in the extension 226 of the casting 140. At the same time, the air pressure in the line 312 feeds into the bottom of the cylinder 204 below its piston 202 and forces the piston 202 upwardly to raise the tool-supporting shaft 146 and lift the tool away from the lens blank L.

Air in the rear portion of the cylinder 252 which was previously used to lock the sleeve 228 is, during the unlocking operation just described, exhausted through the passageway 306 in the valve 284 and through lines 278, 274 into valve 272 and outwardly through the exhaust port 316.

Air in the upper portion of the cylinder 204 which was previously used to lower the piston 202 is now exhausted through lines 278, 274 into valve 272 and outwardly through the exhaust port 316.

Figure 10:
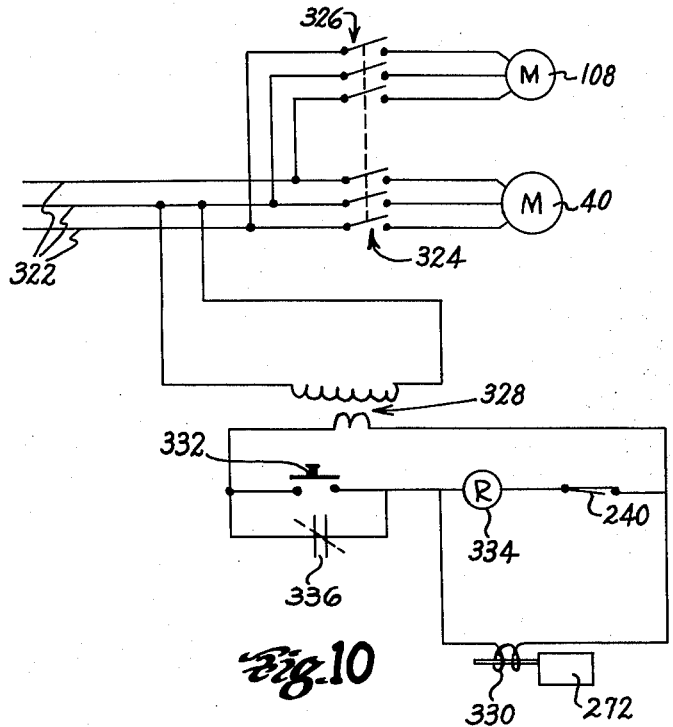
FIG. 10 is a schematic illustration of the fundamental components of an electrical system also incorporated in the apparatus.

In FIG. 10, a simplified electrical circuit is shown to schematically illustrate the operation of the above-described components of the unit A.

As it can be seen in FIG. 10, the motor 40 which drives the work spindle 36 and the motor 108 which operates to oscillate the head 64 are operated from a power source 322 and are turned on and off by operation of suitable switches 324 and 326 respectively. Connected to the source of power 322 is a step-down transformer 328 which supplies electrical current to the solenoid operated valve 276. When the solenoid 330 of the valve 272 is energized, it will assume such a position as to cause air from the supply line 270 to enter into the air line 274 and, at the same time, allow other air in the system to exhaust through the line 312 and the exhaust port 316 as described above. When the solenoid 330 is not energized, the valve 272 will assume the other position described above wherein air from the supply line 270 will enter the line 312 and at the same time open the line 274 to the exhaust port 316. Thus, to begin a grinding cycle, a push button 332 (FIG. 10) is pushed to energize a relay 334 which closes a contact 336 completing the circuit through the solenoid 330, the microswitch 240 being normally closed.

With the solenoid 330 energized, air enters the line 274 and, as described above, causes the tool T to lower onto the lens blank L and grind the lens blank L to a predetermined depth in the manner described hereinabove.

When the predetermined depth of cut is reached, the microswitch actuating arm 244 engages the switch button 242 in the manner previously described and opens the switch 240 which de-energizes the relay 334 (see FIG. 10). This opens the contact 336 and breaks the circuit to the solenoid 330 causing the valve to shift so as to now apply air pressure to the air line 312. In do doing, the tool T is caused to retract from the lens blank L as outlined in detail above.

It is pointed out that the electrical circuit shown in FIG. 10 is elementary and is shown only for purposes of illustrating the operation of unit A of the machine 20. More elaborate electrical circuits with conventional protection devices and safety features or the like would normally be used.

Referring more particularly to the details of surface grinding with the apparatus of the invention, it is pointed out that, as opposed to the more conventional milling type of operation wherein a cut of predetermined depth is taken across a lens blank surface by sweeping a tool thereover, the present invention involves what is termed herein as a cap-generating technique. Furthermore, it is pointed out that the operation of the invention is one of grinding a lens surface to a true spherical shape and is not to be confused with finishing operations wherein previously ground surfaces are fined and/or polished with cap-type tools and loose abrasives or the like.

While the tool T is of the cap-type which fits over the surface of the lens blank L, it is a grinding tool and is oscillated about the center of curvature of the surface which is to be ground on the lens blank as it is fed into the lens blank. The grinding face of the tool T is preferably diamond-charged and is formed accurately to the curvature desired to be ground upon the lens blank L.

Figure 11:
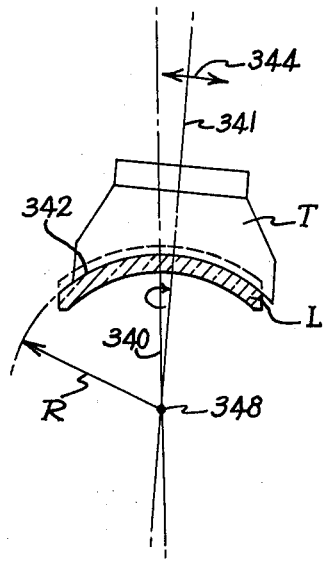
FIG. 11 is a diagrammatic illustration of the general arrangement of parts and technique used in grinding lens blanks in accordance with the invention.

The lens blank L is supported at a fixed level in the chuck 22 and is rotated about its axis 340 which is disposed vertically in the machine 20 (see FIG. 6 and the schematic illustration in FIG. 11).

The tool T is free-floating, as described above, and its abrading face automatically seats against the surface of the lens blank L when brought into engagement therewith. Thus, in order to grind a true finished curvature 342 (see FIG. 11) upon the lens blank L of a predetermined radius of curvature R, the tool T is oscillated as indicated by the double-headed arrow 344 about an axis 346 (see FIG. 6) which intersects the center of curvature 348 (see FIGS. 6 and 11) of the surface 342 to be ground on the lens blank L.

The tool T is offset, as shown in FIGS. 3 and 11, by tilting the head 64 about the axis 346 of the pivot post 86 in the manner described above.

An overall oscillation, as indicated by arrow 344, of from 5 to 15 millimeters is generally considered sufficient to introduce a desired grinding action and to produce the true curvature R upon the lens blank surface. Taking into consideration the extent to which the tool T is oscillated, the angle of tilt of the tool axis 341 (see FIG. 11) relative to the axis 340 of the lens blank L is set to be such as to cause the tool to be positioned with an edge thereof slightly overhanging the edge of the lens blank at all times during the grinding operation. In this way, uneven wear on the grinding face of the tool is avoided and the lens blank is ground to a true spherical curvature from edge to edge. Furthermore, since the tool is tilted about the axis 346 of the pivot post 86 and oscillated about the same axis 346, it can be seen that the axis 341 of the tool is, at all times, disposed normal to a tangent of the curvature being ground on the lens blank with the result that an even pressure is continuously applied to all effective grinding areas of the tool face during the grinding operation. This avoids any tendency for one side or the other of the tool to grind unevenly. The net result of the foregoing being that uneven wear on the tool is avoided and a true spherical curvature will be ground upon the lens blank L.

The effects of rotation of the lens blank L about its axis, oscillation of the tool about the center of curvature of the ultimate surface 342 to be ground on the lens blank L and the free-floating action of the tool T as it is fed coaxially into the lens blank L together function to produce the ultimate true spherical surface 342.

The texture of the ground surface 342 is determined by selection of the grit or diamond size used in making up the abrading face section 156 of the tool T.

It is pointed out that the apparatus of the invention is readily adjustable in such manner as to produce spherical surface curvatures on lens blanks of different selected radii of curvature. In each instance, however, a particular tool T is provided which embodies a grinding face accurately preformed to the radius of surface curvature desired. That is, for each change of curvature, a change of tool is required on the tool-supporting shaft 146.

Since the radius of curvature R (see FIG. 11) about which the tool T is oscillated must be equal to the radius of curvature of the spherical grinding face of the particular tool T which is used, the apparatus is rendered adjustable as follows:

For stronger spherical curvatures which are to be formed, the radius R (see FIG. 11) is shortened by raising the pivot post 86 (see FIG. 6) and for weaker spherical curvatures, the radius R is lengthened by lowering the pivot post 86.

Since the lens blank supporting chuck 22 is fixed at a predetermined level in the machine 20, the head 64 must remain at a fixed level relative to the chuck 22 at all times. Thus, in making the adjustment to raise or lower the pivot post 86, the head is clamped to the machine base 30 by a bracket 350 (see FIGS. 1 and 6). The connection of the head 64 to the bracket 350 is made with a pin 352 as shown in FIG. 6. It is pointed out that this connection is temporary and is only made while adjusting the level of the pivot post 86 relative to the lens blank chuck 22. During operation of the machine 20, the pin 352 is removed.

With the head 64 locked to the machine base 30, as shown in FIG. 6, the locking bolt 143 which clamps the head 64 to the plate 130 is loosened. This permits free sliding movement between the head 64 and the plate 130. That is, the tilting plate 130 which is carried by the oscillating plate 92 and the main slide 66 may all move together as a unit upwardly or downwardly relative to the head 64.

The gib lock 84 is next loosened to free the main slide 66 in its guideway 78 and the entire assembly (the main slide 66 and plates 92 and 130) is adjusted as a unit by operation of the handle 72. In this way, the pivot post 86 is raised or lowered to whatever level is required to cause its axis 346 to intersect the axis 340 of the work spindle 36 at a point 348 (see FIG. 11) which is the center of curvature of the particular surface 342 to be formed on the lens blank L. The above adjustment, it can be seen, is to shorten or lengthen the radius R in accordance with the radius of the curvature which is to be ground upon a particular lens blank L.

A stationary scale 354 and a pointer 356 which is movable with the main slide 66 is provided to indicate different settings for some of the different radii of curvature. In this way, one may simply adjust the main slide so as to position the pointer 356 at a chosen index mark on the scale 354 which will automatically properly locate the axis 346 at a required level. It is pointed out that any suitable scale and pointer may be used for this purpose, one being movable relative to the other in accordance with the movement of the pivot post 86 relative to the chuck 22.

Once the axis 346 of the pivot post 86 has been set at a proper level, the gib lock 84 is again tightened. The pin 352 is then removed to release the head 64 from the machine base 30 and the above-described abrading operation is carried out.

It is pointed out that while improved, simple and economical means and method have been provided for accomplishing all of the objects and advantages of the invention, many changes in the details of construction, arrangement of parts and steps in the process may be made without departing from the spirit of the invention as expressed in the accompanying claims. Therefore, the invention is not to be limited to the exact matters shown and described as only preferred matters have been given by way of illustration.

Having described our invention, we claim:

1. Apparatus of the character described for grinding a curved surface on a lens blank comprising a rotatable work spindle having means on one end thereof adapted to receive and support a lens blank in substantially coaxially aligned relation with said work spindle, means for rotating said work spindle to cause a lens blank supported thereon to be rotated substantially about its axis, a tool having a grinding face preformed to the curvature desired to be ground on said lens blank, tool-supporting means arranged to support and move said tool toward said lens blank into engagement with the surface thereof to be ground, said movement being along a second axis intersecting the axis of said work spindle at a point located substantially at the center of curvature of said surface to be ground on said lens blank, means for oscillating said tool-supporting means arcuately about a third axis disposed substantially normal to and intersecting the axis of said work spindle substantially at said point of intersection thereon of said second axis and depth of cut control means responsive to initial engagement of said tool with said lens blank for setting said apparatus to limit the extent of further movement of said tool toward said lens blank in accordance with a predetermined depth of cut desired on said blank.

2. Apparatus of the character described for grinding a curved surface on a lens blank comprising a rotatable work spindle having means on one end thereof adapted to receive and support a lens blank in substantially coaxially aligned relation with said work spindle, means for rotating said work spindle to cause a lens blank supported thereon to be rotated substantially about its axis, a tool having a grinding face preformed to the curvature desired to be ground on said lens blank, tool-supporting means arranged to support and move said tool toward said lens blank into engagement with the surface thereof to be ground, said movement being along a second axis obliquely angled relative to the axis of said work spindle and intersecting the same at a point thereon substantially at the center of curvature of said surface to be ground on said lens blank, the angular relationship of said axis of said work spindle and said second axis being such as to cause said tool to be disposed generally to one side of said lens blank with an edge thereof overhanging an edge of said lens blank when said tool engages said lens blank, means for oscillating said tool arcuately about a third axis disposed substantially normal to said axis of said work spindle and intersectiing said point on said work spindle, means for selectively locating the point of intersection of said second and third axes at different locations along said axis of said work spindle in accordance with different radii of curvature desired to be ground on different lens blanks and depth of cut control means responsive to initial engagement of said tool with said lens blank for setting said apparatus to limit the extent of further movement of said tool toward said lens blank in accordance with a predetermined depth of cut desired on said blank.

3. Apparatus of the character described for grinding a convexly curved spherical surface on a lens blank comprising a base having a rotatable work spindle supported thereon, a tool-carrying head disposed adjacent an end of said work spindle, means on said base for supporting said head, a chuck on said end of said work spindle adapted to receive and support a lens blank in substantially coaxially aligned relation with said work spindle, means for rotating said work spindle about its axis, a tool-supporting shaft adjustably carried in said head and arranged to be movable toward and away from said lens blank along a second axis inclined relative to and intersecting the axis of said work spindle, a cap-type tool having a concavely curved grinding face preformed to the radius of curvature desired to be ground on said lens blank, means connecting said tool to an end of said tool-supporting shaft with said grinding face of said tool being directed toward said lens blank, actuating means operable to move said tool-supporting shaft and tool toward and away from said lens blank to cause said face of said tool to come into grinding relation with a side of said lens blank, depth of cut control means responsive to initial engagement of said tool with said lens blank for setting said apparatus to limit the extent of further movement of said tool toward said lens blank from the point of initial engagement therewith in accordance with a predetermined depth of cut desired on said side of said lens blank, means for oscillating said head and tool arcuately during grinding about a third axis disposed substantially normal to and intersecting both the axis of said work spindle and said second axis at a common point, said common point normally being spaced from the ultimate location of the ground surface intended to be provided on said lens blank a distance substantially equal to the radius of curvature desired of said ground surface and means for placing said common point of intersection at different locations along said axis of said work spindle in accordance with different radii of curvature desired to be ground upon different lens blanks.

4. Apparatus of the character described for grinding a convexly curved spherical surface on a lens blank comprising a base having a rotatable work spindle supported thereon, a chuck on said end of said work spindle adapted to receive and support a lens blank in substantially coaxially aligned relation with said work spindle, means for rotating said work spindle about its axis, a tool-carrying head disposed adjacent an end of said work spindle, means on said base for supporting said head, a tool-supporting shaft adjustably carried in said head and arranged to be movable toward and away from said lens blank along a second axis inclined relative to and intersecting the axis of said work spindle, a cap-type tool having a concavely curved grinding face preformed to the radius of curvature desired to be ground on said lens blank, means connecting said tool to an end of said tool-supporting shaft with said grinding face of said tool being directed toward said lens blank, actuating means operable under fluid pressure to move said tool-supporting shaft and tool toward and away from said lens blank to cause said face of said tool to come into grinding relation with a side of said lens blank, said fluid pressure in said actuating means being substantially immediately subject to change upon initial engagement of said tool with said lens blank, depth of cut control means responsive to a change in said fluid pressure, said depth of cut control means being actuable by said change in fluid pressure to limit the extent of further movement of said tool toward said lens blank from said point of initial engagement in accordance with a predetermined depth of cut desired on said side of said lens blank, means for oscillating said head and tool arcuately during grinding about a third axis disposed substantially normal to and intersecting both the axis of said work spindle and said second axis at a common point, said common point normally being spaced from the ultimate location of the ground surface intended to be provided on said lens blank a distance substantially equal to the radius of curvature desired of said ground surface and means for locating said common point of intersection at different locations along said axis of said work spindle in accordance with different radii of curvature desired to be ground upon different lens blanks.

5. Apparatus of the character described for grinding a convexly curved spherical surface on a lens blank comprising a base having a rotatable work spindle supported thereon, a chuck on said end of said work spindle adapted to receive and support a lens blank in substantially coaxially aligned relation with said work spindle, means for rotating said work spindle about its axis, a tool-carrying head disposed adjacent an end of said work spindle, means on said base for supporting said head, a tool-supporting shaft adjustably carried in said head and arranged to be movable toward and away from said lens blank along a second axis inclined relative to and intersecting the axis of said work spindle, a cap-type tool having a concavely curved grinding face preformed to the radius of curvature desired to be ground on said lens blank, means connecting said tool to an end of said tool-supporting shaft with said grinding face of said tool being directed toward said lens blank, piston-operated actuating means operable under fluid pressure to move said tool-supporting shaft and tool toward and away from said lens blank, a fluid supply system associated with said actuating means and embodying a selector valve operable in one position to apply fluid pressure from a source thereof to one side of a piston in said actuating means so as to move said tool against said lens blank, said selector valve being shiftable to a second position such as to apply said fluid pressure to the opposite side of said piston to lift said tool away from said lens blank, said fluid in said actuating means being substantially immediately subject to change in pressure upon initial engagement of said tool with said lens blank, depth of cut control means responsive to a change in said fluid pressure, said depth of cut control means being actuable by said change in fluid pressure to limit the extent of further movement of said tool toward said lens blank from said point of initial engagement in accordance with a predetermined depth of cut desired on said side of said lens blank, switching means incorporated in said depth of cut control means operable when said depth of cut has been reached to cause said selector valve to shift to said second position and thereby cause said tool to move away from said lens blank, means for oscillating said head and tool arcuately during grinding about a third axis disposed substantially normal to and intersecting both the axis of said work spindle and said second axis at a common point, said common point normally being spaced from the ultimate location of the ground surface intended to be provided on said lens blank a distance substantially equal to the radius of curvature desired of said ground surface and means for locating said common point of intersection at different locations along said axis of said work spindle in accordance with different radii of curvature desired to be ground upon different lens blanks.

6. Apparatus of the character described for grinding a curved surface on a lens blank comprising a base having a rotatable work spindle supported thereon, means on an end of said work spindle adapted to receive and support a lens blank in substantially coaxially aligned relation with said work spindle, means for rotating said work spindle to cause a lens blank supported thereon to be rotated substantially about its axis, a tool-carrying head disposed adjacent said lens blank supporting means, an upstanding head-supporting member fixed to said base, said supporting member having a slideway therein disposed in a direction substantially parallel to the axis of said work spindle, a first plate member fitted for sliding movement in said slideway, means for sliding said first plate member along said slideway to desired adjusted positions therealong, means for selectively locking said first plate member against movement in said slideway at said desired adjusted positions therealong, a pivot post fixed to said slideway adjacent one end thereof having an axis disposed substantially normal to and intersecting said axis of said work spindle, a second plate member journaled on said pivot post and disposed substantially flatly against said first plate member, drive means carried by said first plate member and interconnected with said second plate member for effecting oscillation of said second plate member relative to said first plate member arcuately about said pivot post, a third plate member journalled to said pivot post and disposed substantially flatly against said second plate member, said third plate member being rotatably adjustable about said axis of said pivot post, means for selectively locking and unlocking said third plate member to and from said second plate member, slide means cooperatively interconnecting said third plate member and tool-carrying head, said slide means extending substantially radially from said axis of said pivot post and arranged to permit relative adjustment between said third plate member and tool-carrying head toward and away from said pivot post, means for selectively locking and unlocking said tool-carrying head to said third plate member, a tool-supporting shaft slidably mounted in said tool-carrying head arranged to be movable toward and away from said lens blank supporting means on said work spindle, the axis of said tool-supporting shaft being inclined relative to the axis of said work spindle in accordance with the extent of rotational adjustment of said third plate member on said second plate member, said axis of said tool-supporting shaft further being in intersecting relation with said axis of said work spindle and extending radially at all times from said axis of said pivot post, a tool having a concavely curved grinding face preformed to the radius of curvature desired to be ground on said lens blank and means connecting said tool to said tool-carrying shaft with said grinding face being directed toward said lens blank supporting means.

7. Apparatus of the character described for grinding a curved surface on a lens blank comprising a base having a rotatable work spindle supported thereon, means on an end of said work spindle adapted to receive and support a lens blank in substantially coaxially aligned relation with said work spindle, means for rotating said work spindle to cause a lens blank supported thereon to be rotated substantially about its axis, a tool-carrying head disposed adjacent said lens blank supporting means, an upstanding head supporting member fixed to said base, said supporting member having a slideway therein disposed in a direction substantially parallel to the axis of said work spindle, a first plate member fitted for sliding movement in said slideway, means for sliding said first plate member along said slideway to desired adjusted positions therealong, means for selectively locking said first plate member against movement in said slideway at said desired adjusted positions therealong, a pivot post fixed to said slideway adjacent one end thereof having an axis disposed substantially normal to and intersecting said axis of said work spindle, a second plate member journalled on said pivot post and disposed substantially flatly against said first plate member, drive means carried by said first plate member and interconnected with said second plate member for effecting oscillation of said second plate member relative to said first plate member arcuately about said pivot post, a third plate member journalled to said pivot post and disposed substantially flatly against said second plate member, said third plate member being rotatably adjustable about said axis of said pivot post, means for selectively locking and unlocking said third plate member to and from said second plate member, slide means cooperatively interconnecting said third plate member and tool-carrying head, said slide means extending substantially radially from said axis of said pivot post and arranged to permit relative adjustment between said third plate member and tool-carrying head toward and away from said pivot post, means for selectively locking and unlocking said tool-carrying head to said third plate member, a tool-supporting shaft slidably mounted in said tool-carrying head arranged to be movable toward and away from said lens blank supporting means on said work spindle, the axis of said tool-supporting shaft being inclined relative to the axis of said work spindle in accordance with the extent of rotational adjustment of said third plate member on said second plate member, said axis of said tool-supporting shaft further being in intersecting relation with said axis of said work spindle and extending radially at all times from said axis of said pivot post, a tool having a concavely curved grinding face preformed to the radius of curvature desired to be ground on said lens blank, means connecting said tool to said tool-carrying shaft with said grinding face thereof being directed toward said lens blank supporting means, piston-operated actuating means on said tool-carrying head operable under fluid pressure to move said tool-supporting shaft and tool toward and away from a lens blank in said means for supporting the same, a fluid supply system associated with said actuating means and embodying a selector valve operable in one position to apply fluid pressure from a source thereof to one side of a piston in said actuating means so as to move said tool against said lens blank, said selector valve being shiftable to a second position such as to cause said fluid pressure to be applied to the opposite side of said piston to lift said tool away from said lens blank, said fluid in said actuating means being substantially immediately subject to change in pressure upon initial engagement of said tool with said lens blank, depth of cut control means responsive to a change in said fluid pressure, said depth of cut control means being actuable by said change in fluid pressure to limit the extent of further movement of said tool toward said lens blank from said point of initial engagement in accordance with a predetermined depth of cut desired on said side of said lens blank and switching means incorporated in said depth of cut control means operable when said depth of cut has been reached to cause said selector valve to shift to said second position and thus cause said tool to move away from said lens blank.

8. The method of grinding a curved surface on a lens blank comprising providing a tool having a grinding face preformed to the radius of curvature desired to be ground on said lens blank, rotating said lens blank about its axis, moving said tool toward and into engagement with said lens blank along a second axis oblique to said lens blank axis and intersecting said lens blank axis at a point thereon established to be the center of curvature of the surface to be ultimately ground on said lens blank, oscillating said tool arcuately about a third axis disposed substantially normal to said lens blank axis and intersecting the same substantially at said point of intersection thereon of said second axis to effect grinding of said blank and grinding said lens blank to a predetermined depth referenced from the point of initial engagement of said tool with said lens blank.

9. The method of grinding a curved surface on a lens blank comprising providing a tool having a grinding face preformed to the radius of curvature desired to be ground on said lens blank, rotating said lens blank about its axis, moving said tool under controlled pressure into engagement with the surface of the lens blank along a second axis oblique to the axis of said lens blank and intersecting said lens blank axis at a point thereon spaced a predetermined distance from the ultimate location of said curved surface to be ground which distance is substantially equal to the radius to be ground on curvature desired of said surface, allowing said tool freedom to swivel about a point on said second axis during said grinding, simultaneously oscillating said tool arcuately about a third axis disposed substantially normal to said lens blank axis and intersecting said third axis substantially at said point of intersection thereon of said second axis and grinding said lens blank to a predetermined depth referenced from the point of initial engagement of said tool with said lens blank.

10. The method of grinding a curved surface on a lens blank comprising providing a tool having a grinding face preformed to the radius of curvature desired to be ground on said lens blank, rotating said lens blank about its axis, moving said tool under controlled pressure toward said lens blank along a second axis which intersects said lens blank axis at a point thereon spaced a radial distance from and approximately equal to the radius of curvature desired to be ground on said lens blank, oscillating said tool arcuately about a third axis disposed substantially normal to said lens blank axis and intersecting the same substantially at said point of intersection thereon of said second axis, detecting change in said pressure resulting from initial engagement of said tool with said lens blank, utilizing said change in pressure to limit the extent of further movement of said tool toward said lens blank from said point of initial engagement in accordance with a predetermined depth of cut desired on said lens blank and causing said tool to retract from said lens blank substantially immediately upon reaching said predetermined depth of cut.

11. The method of grinding a curved surface on a lens blank comprising providing a tool having a grinding face preformed to the radius of curvature desired to be ground on said lens blank, rotating said lens blank about its axis, moving said tool under controlled pressure toward said lens blank along a second axis inclined to said lens blank axis and intersecting the same at a point thereon spaced a distance from the ultimate location of said curved surface to be ground which distance is substantially equal to the radius of curvature desired of said ground surface, said inclination of said second axis relative to said lens blank axis being such as to cause an edge of said tool to over-ride an edge of said lens blank, oscillating said tool arcuately about a third axis disposed substantially normal to said lens blank axis and intersecting the same substantially at said point of intersection thereon of said second axis, restricting the extent of said oscillation to within such limits as to retain an overriding relationship of said tool grinding face on said lens blank at all times, detecting change in said pressure as a result of initial engagement of said tool with said lens blank, utilizing said change in pressure to limit further movement of said tool toward said lens blank from said point of initial engagement in accordance with a predetermined depth of cut desired on said lens blank and causing said tool to retract from said lens blank substantially immediately upon reaching said predetermined depth of cut.

References Cited by the Examiner
UNITED STATES PATENTS

| | | | |
|---|---|---|---|
| 2,633,675 | 4/53 | Ellis. | |
| 2,649,667 | 8/53 | Cooke | 51—131 |
| 2,737,759 | 3/56 | Long et al. | 51—33 X |
| 2,747,339 | 5/56 | Schelling. | |
| 2,919,523 | 1/60 | Phillips | 51—284 |
| 2,994,164 | 8/61 | Dalton | 51—284 X |

LESTER M. SWINGLE, *Primary Examiner.*

JOHN C. CHRISTIE, *Examiner.*